(12) United States Patent
Jang et al.

(10) Patent No.: US 9,395,194 B2
(45) Date of Patent: Jul. 19, 2016

(54) SYSTEM AND METHOD FOR PROVIDING TILE-MAP USING ELECTRONIC NAVIGATION CHART

(71) Applicant: Electronics and Telecommunications Research Institute, Daejeon (KR)

(72) Inventors: In Sung Jang, Sejong (KR); Chung Ho Lee, Daejeon (KR); Min Soo Kim, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 261 days.

(21) Appl. No.: 14/049,083

(22) Filed: Oct. 8, 2013

(65) Prior Publication Data

US 2014/0253577 A1 Sep. 11, 2014

(30) Foreign Application Priority Data

Mar. 8, 2013 (KR) ........................ 10-2013-0025122

(51) Int. Cl.
*G09G 5/02* (2006.01)
*G01C 21/32* (2006.01)
*G09B 29/00* (2006.01)

(52) U.S. Cl.
CPC .............. *G01C 21/32* (2013.01); *G09B 29/005* (2013.01); *G09B 29/007* (2013.01)

(58) Field of Classification Search
None
See application file for complete search history.

(56) References Cited

U.S. PATENT DOCUMENTS

| 9,036,509 | B1* | 5/2015 | Addepalli | H04W 4/046 370/259 |
| 2006/0200308 | A1* | 9/2006 | Arutunian | G06Q 30/00 701/532 |
| 2006/0256130 | A1* | 11/2006 | Gonzalez | G06F 17/3089 345/619 |
| 2007/0226314 | A1* | 9/2007 | Eick | G06F 17/30896 709/217 |
| 2013/0328941 | A1* | 12/2013 | Carbonneau | G06T 11/00 345/667 |

FOREIGN PATENT DOCUMENTS

KR 10-2012-0075626 A 7/2012

OTHER PUBLICATIONS

Li et al. "Spatial Index Study for Multi-Dimensiona Vector Data Based on Improved Quade-tree Encoding", International Symposium on Spatial Analysis, Spatial-Temporal Data Modeling, and Data Mining, Proc. of SPIE vol. 7492, 749135, 2009.*
Insung Jang et al., "Title Map Navigation Chart and Display System", International Symposium on Remote Sensing 2012 International Conference on Space, Aeronautical and Navigation Electronics, Oct. 10-12, 2012, pp. 43-46, Incheon, Republic of Korea.

* cited by examiner

*Primary Examiner* — Yingchun He

(57) ABSTRACT

A system and method are provided, the system and method for providing a tile map related to a region having low data frequency or a region having same color property, by providing the tile map using not only national territorial information on land but also marine spatial information and dynamic sensing information.

13 Claims, 5 Drawing Sheets

SYSTEM AND METHOD FOR PROVIDING TILE-MAP USING ELECTRONIC NAVIGATION CHART

CROSS-REFERENCE TO RELATED APPLICATION

This application claims the benefit of Korean Patent Application No. 10-2013-0025122, filed on Mar. 8, 2013, in the Korean Intellectual Property Office, the disclosure of which is incorporated herein by reference.

BACKGROUND

1. Field of the Invention

The present invention relates to a system and method for providing an image of a web or local storage system, or tile map data in a vector form, and more particularly, to a system and method for providing a tile map related to a region having low data frequency or a region having same color attribute, by providing the tile map using not only national territorial information on land but also marine spatial information and dynamic sensing information.

2. Description of the Related Art

A spatial information service technology provides users with spatial information and various relevant attribute information. Not only overseas enterprises but also domestic enterprises actively provide spatial information services such as a map service or OpenAPI on the web.

Conventionally, a tile map service (TMS) has been mainly used as the spatial information service. The TMS divides a static map image into tile images according to a particular reduced scale, and selects and transmits only map tiles meeting a user request from original map data. When the tile images are used, dynamic rendering of the map becomes unnecessary, accordingly increasing speed of a web geographic information system (GIS).

Open geospatial consortium (OGC), which is a standardized group of the spatial information service industry, also adopted and published a web map tile service (WMTS) standard applying the TMS, following conventional web map service (WMS), web feature service (WFS), and web coverage service (WCS).

According to the conventional spatial information service, a number of necessary tile maps is increased by geometric progression according to an increase in a reduced scale level. The sea occupies almost 70% of a global surface and deserts occupies almost 10% of an entire land area. However, since a most part of the tile maps include an area in only a single color, objects necessary to be expressed in a high zoom level are not properly expressed.

Furthermore, as to the spatial information service, with development of a 2-dimensional (2D) land map, a 3D land map, a satellite/aerial image, or a road/street view, a demand for an electronic navigation chart, navigation information, and marine information is predicted to increase. Consequently, interest in related web service technologies is increasing. However, due to absence of data or a great number of files of the tile map image in the same color, there is a desire for a technology for increasing a time for storing the tile map image and capacity efficiency.

SUMMARY

An aspect of the present invention provides a tile map generation apparatus including a layer set unit to add at least one layer including at least one of national spatial information, marine spatial information, and dynamic sensing information, to set a presentation order and presentation zoom level with respect to the at least one added layer, and to set presentation style information with respect to the at least one added layer; a tiling set unit to set environmental parameters of tiling for generation of a tile map; and a tile map generation control unit to select whether to express the at least one added layer and select at least one layer to be presented on the tile reduced scale, to select an object included in the tile region, and to generate image-based tile map data, vector-based tile map data, and extension additional data based on the selected object.

The layer set unit may set a first presentation style with respect to at least one style selected from a line thickness, a background color, a foreground color, and a symbol of the at least one added layer, and a second presentation style with respect to at least one analysis function selected from a thematic analysis, a distribution map analysis, a statistical analysis, and a mining analysis.

The tile set unit may set at least one of identification information, a tile region, a tile reduced scale section, a coordinate system, and a vector tile generation condition with respect to a tile map service.

The tile map generation control unit may include a layer check unit to check whether at least one layer is to be expressed, and select at least one layer presented on the tile reduced scale according to the presentation order, an object select unit to select the object included in the tile region of the selected layer, and check a presentation state of the object according to a column attribute value; and a tile map generation unit to determine presence of the selected object, and to match the extension additional data having the background color as tile color information with tile map identification information when the selected object is absent or generate the image-based tile map data and the vector-based tile map data by reflecting the set presentation style information when the select object is present.

The tile map generation unit may match the generated extension additional data with the tile map identification information and load a match result on a database (DB).

The tile map generation unit may generate image data in an N×M times size, where N and M are natural numbers, with respect to a width and a length of the tile region in a memory device context (DC), based on the set presentation style information, and divide the image data into at least one tile map data.

The tile map generation unit may match the tile map identification information with the extension additional data including the tile color information and load a match result on a DB when the tile color information of the at least one tile map data corresponds to a single color.

The tile map generation unit may generate the vector-based tile map data when the at least one tile map data includes the dynamic sensing information.

The tile map generation unit may generate the vector-based tile map data by encoding and compressing geographical spatial information and attribute information.

The tile map generation control unit may generate the image-based tile map data, the vector-based tile map data, and the extension additional data, corresponding to an updated region, by comparing at least one existing layer with at least one updated layer.

Another aspect of the present invention provides a tile map providing server including a file storage unit to store tile map data including image-based tile map data, vector-based tile map data, and extension additional data; a request analysis and response unit to analyze a map region information request received from a client, and transmit the tile map data corresponding to the analyzed map region information request to the client; and a request processing unit to read the tile map data from the file storage unit in response to the analyzed map region information request, and process the tile map data.

The request processing unit may process image data corresponding to tile color information included in the extension additional data when the analyzed map region information request is related to a region including the extension additional data.

Still another aspect of the present invention provides a tile map receiving client including a tile map request unit to transmit a map region information request to a server; a tile map manage unit to control storage of tile map data including at least one of image-based tile map data, vector-based tile map data, and extension additional data; a presentation unit to generate map the data by receiving the tile map data and merging at least one tile map data, and store the map data or provide the map data to the user.

Yet another aspect of the present invention provides a tile map providing system including a tile map providing server to store tile map data including image-based tile map data, vector-based tile map data, and extension additional data, and to analyze a map region information request received from a client so as to process the tile map data corresponding to the analyzed map region information request and transmit the processed tile map data to the client; and a tile map receiving client to control storage of the tile map data received from the tile map providing server, to transmit the map region information request to the tile map providing server, and to generate map data by receiving the tile map data and merging at least one tile map data and store the map data or providing the map data to a user.

Further another aspect of the present invention provides a tile map generation method including adding at least one layer which includes at least one of national spatial information, marine spatial information, and dynamic sensing information; setting a presentation order and presentation zoom level with respect to the at least one added layer, and setting presentation style information with respect to the at least one added layer; setting tiling for tiling for providing a tile map service; selecting whether to express the at least one added layer and at least one layer to be presented on the tile reduced scale, and selecting an object included in the tile region; and generating image-based tile map data, vector-based tile map data, and extension additional data based on the selected object.

Effect

According to embodiments of the present invention, disc space efficiency may be increased with respect to a region having low frequency of data such as an object or a region corresponding to a tile map including only a single color. In addition, a communication load of a spatial information service may be reduced.

Additionally, according to embodiments the present invention, various analyses may be performed based on dynamic sensing information and static sensing information, and the analysis result may be reflected in tile presentation.

Additionally, tiling is performed in consideration of not only image-based tile map data and vector-based tile map data but also extension additional data. Thus, various styles may be applied in a client.

In addition, according to embodiments of the present invention, data having a small change period may be presented together with an image tile map whereas data having a large change period or small-capacity data may be tiled to dynamic vector-based tile map data. Thus, tiling may be managed with various styles.

Moreover, according to embodiments of the present invention, time series tiling management may be achieved by using not an entire region but only an update region corresponding to map update information when updating the tile map image according to a map update.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
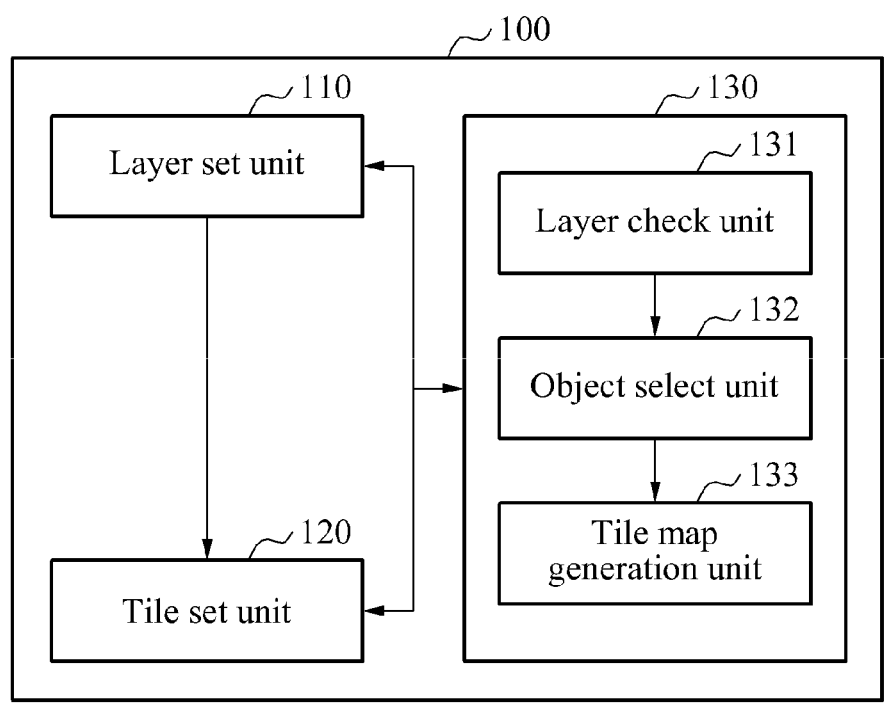
FIG. 1 is a block diagram illustrating a configuration of a tile map generation apparatus using an electronic navigation chart, according to an embodiment of the present invention.

Reference will now be made in detail to exemplary embodiments of the present invention, examples of which are illustrated in the accompanying drawings, wherein like reference numerals refer to the like elements throughout.

In the description of the present invention, if detailed descriptions of related disclosed art or configuration are determined to unnecessarily make the subject matter of the present invention obscure, they will be omitted. Terms to be used below are defined based on their functions in the present invention and may vary according to users, user's intentions, or practices. Therefore, the definitions of the terms should be determined based on the entire specification.

FIG. 1 is a block diagram illustrating a configuration of a tile map generation apparatus 100 using an electronic navigation chart, according to an embodiment of the present invention.

Referring to FIG. 1, the tile map generation apparatus 100 may include a layer set unit 110, a tiling set unit 120, and a tile map generation control unit 130.

The layer set unit 110 may add at least one layer including at least one of national spatial information, marine spatial information, and dynamic sensing information, set a presentation order and presentation zoom level with respect to the at least one added layer, and also set presentation style information with respect to the at least one added layer.

According to the embodiment, the layer set unit 110 may set a first presentation style with respect to at least one style selected from a line thickness, a background color, a foreground color, and a symbol of the at least one added layer, and a second presentation style with respect to at least one analysis function selected from a thematic analysis, a distribution map analysis, a statistical analysis, and a mining analysis.

The first presentation style may be an S-52 standard or an S-10X standard, or may be a style adjusted by correcting a presentation standard. The second presentation style may include (1) thematic map analysis including an individual map, a range map, a proportion map, or a density map for each of the at least one added layer, (2) distribution analysis such as IDW or Heat MAP, and (3) advanced presentation methods such as the statistical analysis or the mining analysis.

The dynamic sensing information may include marine observation data such as marine weather, a water temperature, and salinity.

The tiling set unit 120 may set tiling for providing a tile map service (TMS).

Depending on embodiments, the tiling set unit 120 may set at least one of identification information, a tile region, a tile reduced scale section, a coordinate system, and a vector tile generation condition with respect to the TMS. The vector tile generation condition may include at least one of a generation period, a capacity reference, and a layer select condition.

The tile map generation control unit 130 may select whether to express the at least one added layer and at least one layer to be presented on the tile reduced scale, and select an object included in the tile region. In addition, the tile map generation control unit 130 may repeatedly generate image-based tile map data, vector-based tile map data, and extension additional data based on the selected object.

Depending on embodiments, the tile map generation control unit 130 may compare at least one existing layer with at least one updated layer, thereby generating the image-based tile map data, the vector-based tile map data, and the extension additional data, corresponding to an updated region.

For this purpose, the tile map generation control unit 130 may include a layer check unit 131, an object select unit 132, and a tile map generation unit 133.

The layer check unit 131 may check whether at least one layer is to be expressed, and select at least one layer presented on the tile reduced scale according to the presentation order.

The object select unit 132 may select the object included in the tile region of the selected layer, and check a presentation state of the object according to a column attribute value. The object may refer to things such as a lighthouse and a coastline, constituting a map. The object select unit 130 may inspect whether the object is to be presented according to the column attribute value as an electronic navigation chart does.

The tile map generation unit 133 may determine presence of the selected object. When the selected object is absent, the tile map generation unit 133 may match the extension additional data having the background color as tile color information with tile map identification information, and load the match result on a database (DB).

When the select object is present, the tile map generation unit 133 may generate image-based tile map data and vector-based tile map data by reflecting the set presentation style information.

Depending on embodiments, the tile map generation unit 133 may generate image data in an N×M times size, where N and M are natural numbers, with respect to a width and a length of the tile region in a memory device context (DC), based on the set presentation style information, and divide the image data into at least one tile map data. The image data may be digitized data.

Depending on embodiments, when the tile color information of the at least one tile map data is single color, the tile map generation unit 133 may match the tile map identification information with the extension additional data including the tile color information, and load the match result on the DB. When the at least one tile map data includes the dynamic sensing information, the tile map generation unit 133 may generate the vector-based tile map data.

The tile map generation apparatus 100 may generate the vector-based tile map data and, when the image is frequently changed, may repeat generation of the vector-based tile map data according to the predetermined generation period. Depending on embodiments, the tile map generation apparatus 100 may add a history time to an extension and maintain history tile map data.

In addition, depending on embodiments, the tile map generation apparatus 100 may generate the vector-based tile map data when the vector-based tile map data includes a layer which is efficient for transmission and presentation or is requested for a style change by a client.

The tile map generation apparatus 100 may generate the vector-based tile map data not in every reduced scale level but in only a particular reduced scale level, while referencing the vector-based tile map data in other reduced scale levels.

In addition, the tile map generation unit 133 may generate the vector-based tile map data by encoding and compressing geographical spatial information and attribute information. For example, the tile map generation unit 133 may use GML, KML, and GeoJSON for formats or may be freely designed by a segmented format.

Table 1 shows a configuration of storing of the vector-based tile map data. In Table 1, the tile map identification information may be a file name in case of a file system, or a key column in case of the DB. Furthermore, minimum boundary region (MBR), version information, and vector tile map (BLOB) (약어인가요 ? full name 기재해 주세요.) may be stored in the configuration.

TABLE 1

| Tile map ID information | MBR | BLOB (GML/GeoJSON/KML/WKBZ) | Version (date) |
| --- | --- | --- | --- |

Hereinafter, a process of dividing image data into tile map data in the memory DC of the tile map generation unit will be described in detail with reference to FIG. 2.

Figure 2:
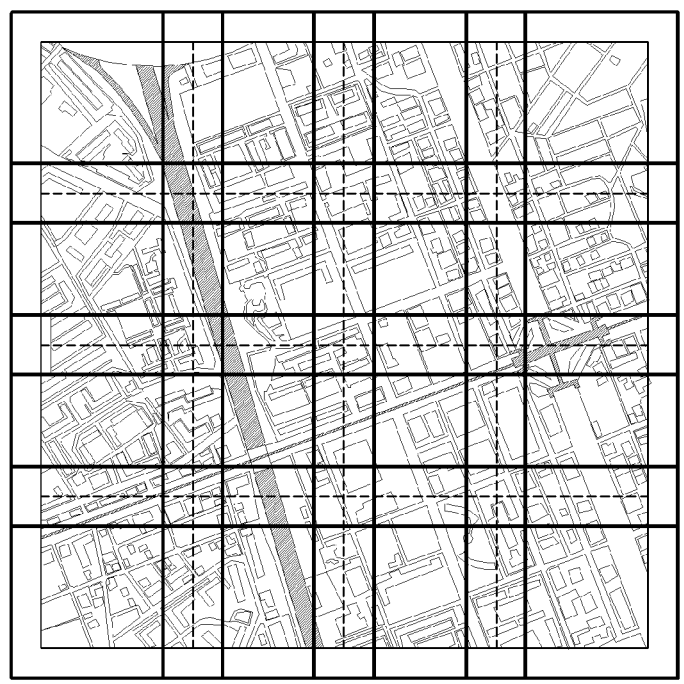
FIG. 2 is a diagram illustrating a process of dividing image data into tile map data through a tile map generation apparatus, according to an embodiment of the present invention.

FIG. 2 is a diagram illustrating a process of dividing image data into tile map data through a tile map generation apparatus, according to an embodiment of the present invention. Referring to FIG. 2, the tile map generation apparatus may generate the image data in an N×M times size, where N and M are natural numbers, with respect to a width and a length of a tile region in a memory DC, based on set presentation style information, and divide the image data into at least one tile map data.

Accordingly, when the tile map generation apparatus presents a symbol related to geographical information of a tile map boundary in consideration of objects only included in a single tile size, the tile map generation apparatus may prevent inclusion of only a part of the object at the boundary.

For example, the tile map generation apparatus may include an object of an outer buffer region, generate the image data in the memory DC in units of a positive number times a width N and a length M of a tile map set within an allowable range of a graphic card memory to reduce overhead, and store the tile map data by dividing the image data into the tile map data.

Depending on embodiments, the N×M times size of the selected region and buffering may also be considered when the object select unit 132 of FIG. 1 selects the object.

When the tile map generation apparatus stores the tile map data by dividing the image data by N×M, the tile map identification information and the extension additional data including the tile color information are matched and the match result may be loaded on the DB. When at least one tile map data includes the dynamic sensing information, the tile map generation apparatus may generate the vector-based tile map data.

For example, when the image data does not include a geographical structure or includes only a single color, the tile map generation apparatus may not generate dedicated tile map data but store only the tile map identification information and the color information in a separate DB or indexed file system. Accordingly, the tile map generation apparatus may use about 8 bytes of the tile map identification information as the key value and about 4 bytes of the color information, thereby providing a storage efficiency of about 14 times in comparison to about 178 bytes necessary for storing a single color image.

Figure 3:
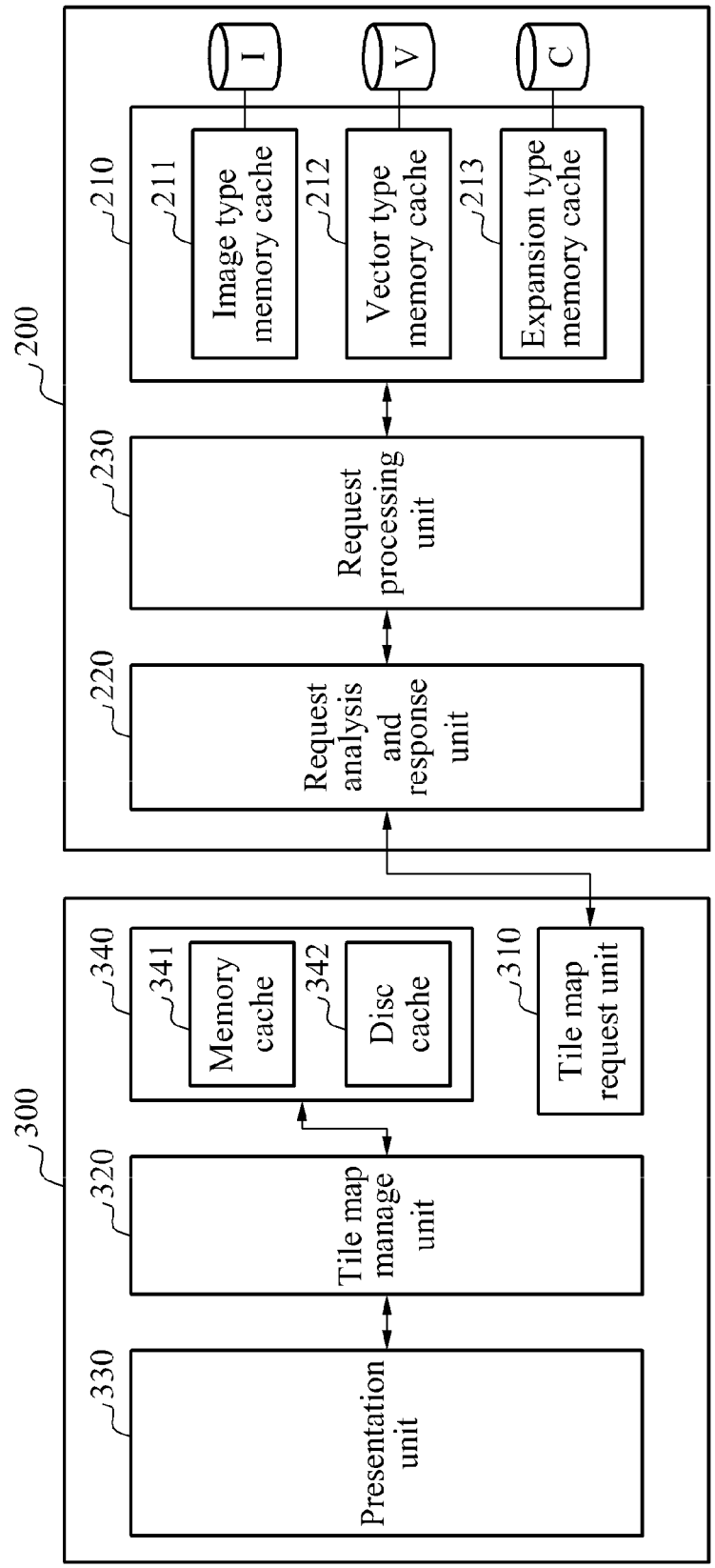
FIG. 3 is a block diagram illustrating a tile map providing system according to an embodiment of the present invention.

FIG. 3 is a block diagram illustrating a tile map providing system according to an embodiment of the present invention.

Referring to FIG. 3, the tile map providing system may include a tile map providing server 200 to provide a TMS, and a tile map receiving client 300 to receive the TMS from the tile map providing server 200 through the network.

The tile map providing server 200 may store tile map data including image-based tile map data, vector-based tile map data, and extension additional data, and may analyze a map region information request received from the tile map receiving client 300. In addition, the tile map providing server 200 may process the tile map data corresponding to the analyzed map region information request and transmit the processed tile map data to the tile map receiving client 300. For this, the tile map providing server 200 may include a file storage unit 210, a request analysis and response unit 220, and a request processing unit 230.

The file storage unit 210 may store the tile map data including the image-based tile map data, the vector-based tile map data, and the extension additional data, and include an image type memory cache 211, a vector type memory cache 212, and an extension type memory cache 213 according to a data type.

The request analysis and response unit 220 may analyze the map region information request received from the tile map receiving client 300, and transmit the tile map data corresponding to the analyzed map region information request to the tile map receiving client 300.

The request processing unit 230 may read the tile map data from the file storage unit 210 in response to the analyzed map region information request, and process the tile map data. Depending on embodiments, when the analyzed map region information request is related to a region including the extension additional data, the request processing unit 230 may process image data corresponding to tile color information included in the extension additional data. The tile map receiving client 300 may control storage of the tile map data received from the tile map providing server 200, and transmit the map region information request to the tile map providing server 200. Also, the tile map receiving client 300 may generate map data by receiving the tile map data and merging at least one tile map data, and store the map data or provide the map data to a user. For this, the tile map receiving client 300 may include a tile map request unit 310, a tile map manage unit 320, and a presentation unit 330.

In detail, the tile map request unit 310 may transmit the map region information request to the tile map providing server 200. The tile map manage unit 320 may control storage of the tile map data including at least one of the image-based tile map data, the vector-based tile map data, and the extension additional data. The presentation unit 330 may generate the map data by receiving the tile map data and merging at least one tile map data, and store the map data or provide the map data to the user.

Although not shown, the network suggested in the embodiment may collectively refer to various types of wired or wireless network enabling transmission and reception of the tile map data between the tile map providing server 200 and the tile map receiving client 300. For example, when the tile map receiving client 300 is a smart phone or a mobile communication terminal, the network may include a wireless mobile communication network such as code division multiple access (CDMA), wideband CDMA (WCDMA), long term evolution (LTE), worldwide interoperability for microwave access (WiMax), and the like. When the tile map receiving client 300 is a static computer, the network may be the wired internet.

When a request for the tile map data including only the color information is received through the tile map providing system according to the embodiment, an image file including only a single color may be generated and provided for compatibility with existing systems.

Furthermore, depending on embodiments, since repeated generating and providing of the image file for the tile map data including only a single color is inefficient in terms of a transmission load, the tile map providing system may separately manage the image file corresponding to a tile map color when providing the image file. For example, with respect to the same tile map color, the image file may be generated once and managed in a cache, so that redundant generation of the image file may be prevented.

Figure 4:
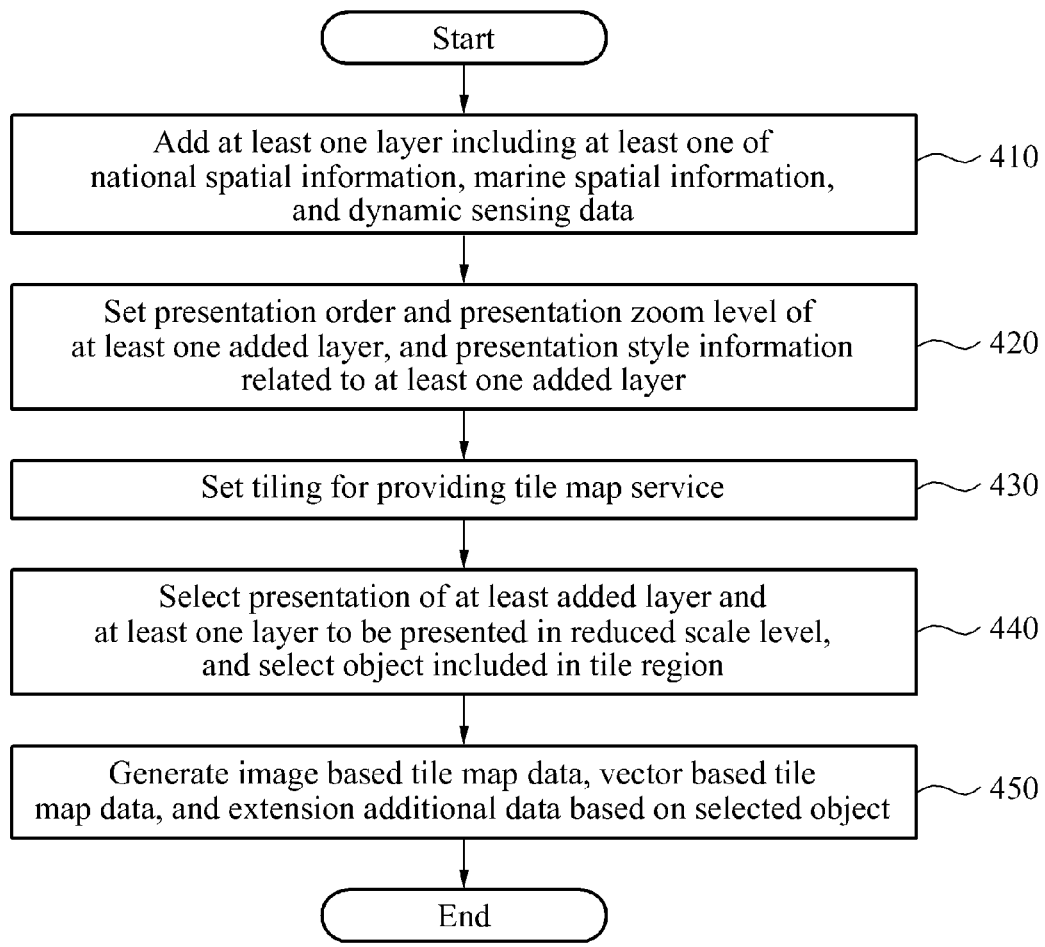
FIG. 4 is a flowchart illustrating a tile map generation method performed in a tile map generation apparatus, according to an embodiment of the present invention.

FIG. 4 is a flowchart illustrating a tile map generation method performed in a tile map generation apparatus, according to an embodiment of the present invention.

Referring to FIG. 4, the tile map generation method may include adding at least one layer which includes at least one of national spatial information, marine spatial information, and dynamic sensing information, that is, operation 410.

In operation 420, a presentation order and presentation zoom level may be set with respect to the at least one added layer, and also presentation style information may be set with respect to the at least one added layer.

In operation 430, tiling for tiling for providing a TMS may be set.

In operation 440, whether to express the at least one added layer and at least one layer to be presented on the tile reduced scale may be selected, and an object included in the tile region may be selected.

In operation 450, image-based tile map data, vector-based tile map data, and extension additional data may be generated based on the selected object. Hereinafter, the process of generating the tile map data will be described in detail with reference to FIG. 5.

Figure 5:
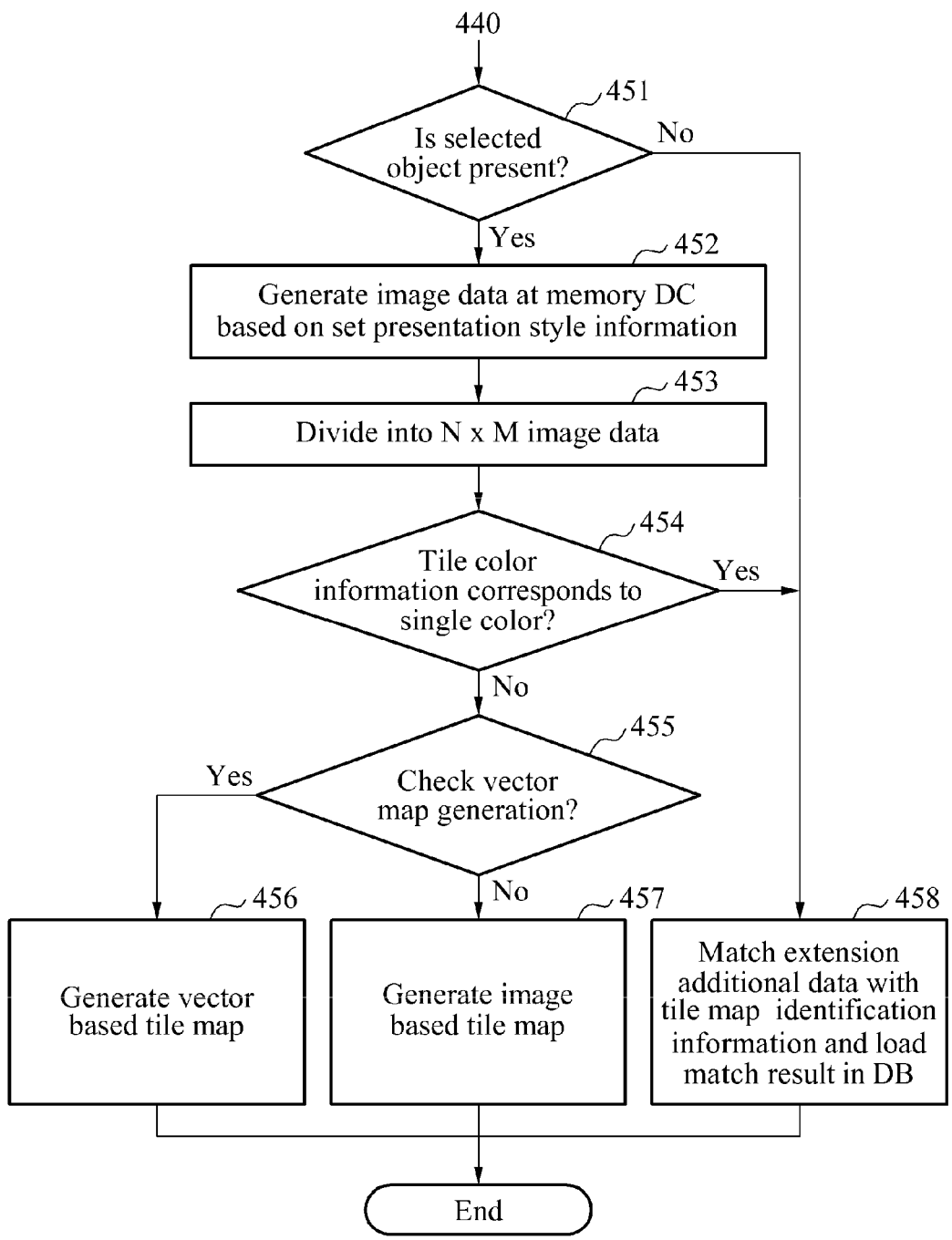
FIG. 5 is a flowchart illustrating a process of generating tile map data in a tile map generation apparatus, according to an embodiment of the present invention.

FIG. 5 is a flowchart illustrating a process of generating tile map data in a tile map generation apparatus, according to an embodiment of the present invention.

Referring to FIG. 5, in operation 451, whether the object selected in operation 440 is present is determined. When the selected object is absent, the extension additional data having the background color as tile color information may be matched with tile map identification information and the match result may be loaded on a DB in operation 458.

When the select object is present as a result of the determination of operation 451, image data for generating image-based tile map data and vector-based tile map data may be generated in a memory DC by reflecting the set presentation style information, in operation 452.

In operation 453, image data may be divided into at least one tile map data in an N×M times size, where N and M are natural numbers, with respect to a width and a length of the tile region based on the set presentation style information. The image data may be digitized data.

In operation 454, whether tile color information of the at least one tile map data corresponds to a single color. When the tile color information corresponds to the single color, tile map identification information may be matched with the extension additional data including the tile color information and the match result may be loaded on the DB, in operation 458.

Conversely, when the tile color information does not correspond to the single color as a result of the determination of operation 454, whether a vector map such as the dynamic sensing information is necessary is determined in operation 455. When the at least one tile map data needs to generate the vector map including the dynamic sensing information as a result of the determination of operation 455, the vector-based tile map data may be generated in operation 456.

Conversely, when generation of the vector map is unnecessary as a result of the determination of operation 455, the image-based tile map data may be generated.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A tile map generation apparatus comprising:
   a storage to store image-based tile map data, vector-based tile map data, and extension additional data; and
   a capable of performing operations comprising:
   a first operation of adding at least one layer including at least one of national spatial information, marine spatial information, and dynamic sensing information, setting a presentation order and presentation zoom level with respect to the at least one added layer, and setting presentation style information with respect to the at least one added layer;
   a second operation of setting environmental parameters of tiling for generation of a tile map;
   a third operation of determining whether to express the at least one added layer, selecting at least one layer to be presented at a tile scale level, selecting an object to be included in a tile region, and generating image-based tile map data, vector-based tile map data, and extension additional data based on the selected object,
   wherein the third operation includes generating the image-based tile map data, the vector-based tile map data, and the extension additional data, corresponding to the tile region, and
   wherein the vector-based tile map data is generated at a particular tile scale level only and
   wherein the third operation comprises:
   a first sub-operation of checking whether at least one layer is to be expressed, and selecting the at least one layer to be presented at the tile scale level according to the presentation order;
   a second sub-operation of selecting the object to be included in the tile region of the selected layer; and
   a third sub-operation of determining presence of the object, and linking the extension additional data having a background color as tile color information to tile map identification information when the object is absent or generating the image-based tile map data and the vector-based tile map data by reflecting the set presentation style information when the object is present.

2. The tile map generation apparatus of claim 1, wherein the setting presentation style information comprises:
   setting a first presentation style with respect to at least one style selected from a line thickness, a background color, a foreground color, and a symbol of the at least one added layer; and
   setting a second presentation style with respect to at least one analysis function selected from a thematic analysis, a distribution map analysis, a statistical analysis, and a mining analysis.

3. The tile map generation apparatus of claim 1, wherein the setting environmental parameters comprises setting at least one of identification information, a tile region, a tile scale section, a coordinate system, and a vector tile generation condition with respect to a tile map service.

4. The tile map generation apparatus of claim 1, wherein the third sub-operation comprises linking the extension additional data to the tile map identification information and loading a linked result into a database (DB).

5. The tile map generation apparatus of claim 1, wherein the third sub-operation comprises generating image data having an N×M times size, where N and M are natural numbers, with respect to a width and a length of the tile region in a memory device context (DC), based on the set presentation style information, and dividing the image data into at least one tile map data.

6. The tile map generation apparatus of claim 5, wherein the third sub-operation comprises linking the tile map identification information to the extension additional data including the tile color information and loading a linked result into a DB when the tile color information of the at least one tile map data corresponds to a single color.

7. The tile map generation apparatus of claim 1, wherein the third sub-operation comprises generating the vector-based tile map data when the at least one tile map data includes the dynamic sensing information.

8. The tile map generation apparatus of claim 1, wherein the third sub-operation comprises generating the vector-based tile map data by encoding and compressing geographical spatial information and attribute information.

9. A tile map providing server comprising:
a storage to store tile map data including image-based tile map data, vector-based tile map data, and extension additional data; and
a capable of performing operations comprising:
analyzing a map region information request received from a client, and transmitting tile map data corresponding to the analyzed map region information request to the client; and
reading the tile map data from the storage in response to the analyzed map region information request, and processing the tile map data,
wherein the tile map data includes image-based tile map data, vector-based tile map data, and extension additional data, corresponding to a tile region that is related to the analyzed map region information request,
wherein the vector-based tile map data is at a particular tile scale level only, and
wherein the processor further comprises generating the image-based tile map data, the vector-based tile map data, and the extension additional data by:
adding at least one layer including at least one of national spatial information, marine spatial information, and dynamic sensing information, setting a presentation order and presentation zoom level with respect to the at least one added layer, and setting presentation style information with respect to the at least one added layer;
setting environmental parameters of tiling for generation of a tile map;
checking whether at least one layer is to be expressed, and selecting the at least one layer to be presented at a tile scale level according to the presentation order;
selecting an object to be included in the tile region of the selected layer; and
determining presence of the object, and linking the extension additional data having a background color as tile color information to tile map identification information when the object is absent or generating the image-based tile map data and the vector-based tile map data by reflecting the set presentation style information when the object is present.

10. The tile map providing server of claim 9, wherein the processor further comprises processing image data corresponding to the tile color information included in the extension additional data when the analyzed map region information request is related to a region including the extension additional data.

11. A tile map receiving client comprising:
a storage; and
a capable of performing operations comprising:
transmitting a map region information request to a server;
controlling storage of tile map data including at least one of image-based tile map data, vector-based tile map data, and extension additional data;
generating map data by receiving the tile map data and merging at least one tile map data; and
storing the map data into a storage or providing the map data to the user,
wherein the image-based tile map data, the vector-based tile map data, and the extension additional data included in the tile map data correspond to a tile region that is related to the map region information request,
wherein the vector-based tile map data is at a particular tile scale level only, and
wherein the image-based tile map data, the vector-based tile map data, and the extension additional data are generated by:
adding at least one layer including at least one of national spatial information, marine spatial information, and dynamic sensing information, setting a presentation order and presentation zoom level with respect to the at least one added layer, and setting presentation style information with respect to the at least one added layer;
setting environmental parameters of tiling for generation of a tile map;
checking whether at least one layer is to be expressed, and selecting the at least one layer to be presented at a tile scale level according to the presentation order;
selecting an object to be included in the tile region of the selected layer; and
determining presence of the object, and linking the extension additional data having a background color as tile color information to tile map identification information when the object is absent or generating the image-based tile map data and the vector-based tile map data by reflecting the set presentation style information when the object is present.

12. A tile map providing system comprising:
a server to store tile map data including image-based tile map data, vector-based tile map data, and extension additional data, and to analyze a map region information request received from a client so as to process the tile map data corresponding to the analyzed map region information request and transmit the processed tile map data to the client; and
the client to control storage of the tile map data received from the server, to transmit the map region information request to the server, and to generate map data by receiving the tile map data and merging at least one tile map data and store the map data into a storage or providing the map data to a user,
wherein the image-based tile map data, the vector-based tile map data, and the extension additional data included in the tile map data correspond to a tile region that is related to the map region information request,
wherein the vector-based tile map data is at a particular tile scale level only, and
wherein the image-based tile map data, the vector-based tile map data, and the extension additional data are generated by:
adding at least one layer including at least one of national spatial information, marine spatial information, and dynamic sensing information, setting a presentation order and presentation zoom level with respect to the at least one added layer, and setting presentation style information with respect to the at least one added layer;
setting environmental parameters of tiling for generation of a tile map;
checking whether at least one layer is to be expressed, and selecting the at least one layer to be presented at a tile scale level according to the presentation order;
selecting an object to be included in the tile region of the selected layer; and
determining presence of the object, and linking the extension additional data having a background color as tile color information to tile map identification information when the object is absent or generating the image-based tile map data and the vector-based tile map data by reflecting the set presentation style information when the object is present.

13. A tile map generation method comprising:
- adding at least one layer which includes at least one of national spatial information, marine spatial information, and dynamic sensing information;
- setting a presentation order and presentation zoom level with respect to the at least one added layer, and setting presentation style information with respect to the at least one added layer;
- setting tiling for providing a tile map service;
- determining whether to express the at least one added layer, selecting at least one layer to be presented at a tile scale level, and selecting an object to be included in a tile region; and
- generating image-based tile map data, vector-based tile map data, and extension additional data based on the selected object,
- wherein the image-based tile map data, the vector-based tile map data, and the extension additional data are generated to correspond to the tile region,
- wherein the vector-based tile map data is generated at a particular tile scale level only,
- wherein the determining comprises:
- checking whether at least one layer is to be expressed, and selecting the at least one layer to be presented at the tile scale level according to the presentation order;
- selecting the object to be included in the tile region of the selected layer; and
- determining presence of the object, and linking the extension additional data having a background color as tile color information to tile map identification information when the object is absent or generating the image-based tile map data and the vector-based tile map data by reflecting the set presentation style information when the object is present, and
- wherein the image-based tile map data and the vector-based tile map data are generated by reflecting the set presentation style information when the object is present.

* * * * *